United States Patent [19]
Nakamura

[11] Patent Number: 5,432,330
[45] Date of Patent: Jul. 11, 1995

[54] TWO-STAGE DETECTION NONCONTACT POSITIONING APPARATUS HAVING A FIRST LIGHT DETECTOR WITH A CENTRAL SLIT

[75] Inventor: Katsushige Nakamura, Tokyo, Japan

[73] Assignee: Mitaka Kohki Co., Ltd., Tokyo, Japan

[21] Appl. No.: 242,872

[22] Filed: May 16, 1994

[30] Foreign Application Priority Data

May 24, 1993 [JP] Japan ................ 5-142490
Jul. 27, 1993 [JP] Japan ................ 5-203746

[51] Int. Cl.$^6$ .............................. G01J 1/20
[52] U.S. Cl. .................. 250/201.4; 250/201.5; 356/400
[58] Field of Search ........... 250/201.2, 201.4, 201.5, 250/548; 356/400, 372; 369/44.24, 44.23; 359/380, 368, 305

[56] References Cited

U.S. PATENT DOCUMENTS

| | | | |
|---|---|---|---|
| 4,556,964 | 12/1985 | Trethewey | 250/201.5 |
| 4,684,797 | 8/1987 | Ando et al. | 250/201.5 |
| 4,843,228 | 6/1989 | Nakamura | 250/201 |

Primary Examiner—David C. Nelms
Assistant Examiner—Que T. Le
Attorney, Agent, or Firm—Michael D. Bednarek; Marks & Murase

[57] ABSTRACT

A two-stage detection noncontact positioning apparatus comprises a light position-detecting mechanism 3 which includes a first light position detector 15 having a slit 17 at a central location corresponding to an optical axis $K_4$, and a light position detector 16 for receiving a measuring beam $S_9$ having passed through the slit 17. The first light position detector 15 can be switchably operated such that while the second light position detector 16 receives the measuring beam, the first light position detector 15 is made inoperative not to detect light. The apparatus also includes an optical mechanism 2 having focusing lenses 13 and 14 provided in a manner corresponding to the first and second light position detectors 15 and 16, respectively. As the measuring beam, a semiconductor laser beam, a He-Ne laser beam or the like is suitably employed, which enables the two-stage detection noncontact positioning apparatus to perform highly accurate positioning without being adversely affected by scattered lights.

45 Claims, 7 Drawing Sheets

TWO-STAGE DETECTION NONCONTACT POSITIONING APPARATUS HAVING A FIRST LIGHT DETECTOR WITH A CENTRAL SLIT

BACKGROUND OF THE INVENTION

1. Field of the Invention

This invention relates to a two-stage detection noncontact positioning apparatus which is capable of focusing on a surface of an object in a noncontacting and highly accurate manner.

2. Description of the Prior Art

It is a technically very difficult problem to achieve optical focusing in a noncontacting manner upon objects of various size, shape, and physical properties. As a focusing technique generally practiced heretofore, there is an image processing technique using a computer.

Such an image processing technique, however, has difficulties in that it requires a large-scale apparatus, and is slow in performing focusing operations because of image scanning to be executed therein, with insufficient reliability due to susceptibility to influence of luminance distribution.

To overcome these difficulties, the present inventor previously proposed a noncontact positioning apparatus (Japanese Laid-open Patent Application (Kokai) No. 62-75411 corresponding to U.S. Pat. No. 4,843,228 and EP Publication No. 0273 717 B1) which utilizes a laser beam. The proposed noncontact positioning apparatus comprises a laser beam-emitting mechanism for emitting a laser beam as a measuring beam, an optical mechanism having mirror means for reflecting the measuring beam in a direction parallel to an optical axis, an objective lens for refracting the measuring beam toward an object and for refracting again the measuring beam reflected from the object, and a focusing lens for causing the measuring beam reflected from the object and refracted by the objective lens to focus on a position located on the optical axis, a light position-detecting mechanism of a split-in-two type for receiving the measuring beam passed through the focusing lens to deliver a position signal, and a focusing mechanism responsive to the position signal from the light position-detecting mechanism for moving at least one of the object and the objective lens to thereby automatically focus the measuring beam on a surface of the object.

SUMMARY OF THE INVENTION

It is an object of the invention to further improve the aforementioned positioning apparatus proposed by the present inventor, thereby providing an positioning apparatus which is capable of focusing with even higher accuracy by making the apparatus insusceptible to influence of scattered lights.

The two-stage detection noncontact positioning apparatus of the invention is characterized in that:

the light position-detecting mechanism comprises a
  first light position detector having a slit formed at a central location corresponding to an optical axis, and a second light position detector for receiving the measuring beam passed through the slit of the first light position detector, and is at the same time adapted to operate in a switchable manner such that when the second light position detector receives the measuring beam, the first light position detector is made inoperative to serve as a shield against scattered lights which are not directed to the slit; and the focusing lens comprises a lens provided in a manner corresponding to the first light position detector and a lens provided in a manner corresponding to the second light position detector.

The above and other objects, features, and advantages of the invention will become more apparent from the following detailed description taken in conjunction with the accompanying drawings.

DETAILED DESCRIPTION OF THE PREFERRED EMBODIMENTS

Figure 1:
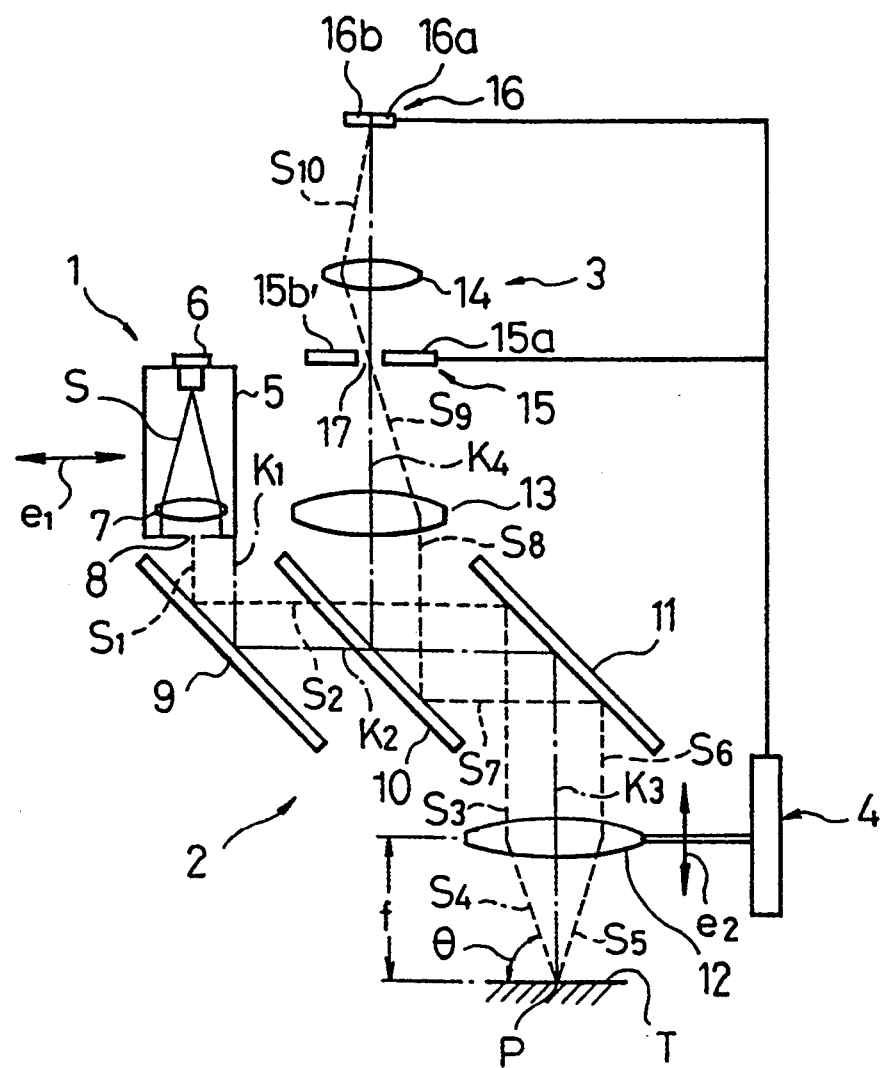
FIG. 1 is a schematic explanatory diagram showing the arrangement of a two-stage detection noncontact positioning apparatus in an in-focus state, according to a first embodiment of the invention.

The invention will be described in detail with reference to the drawings showing preferred embodiments thereof.

FIG. 1 to FIG. 6c show a two-stage detection noncontact positioning apparatus according to a first embodiment of the invention, which is mainly comprised of a laser beam-emitting mechanism 1, an optical mechanism 2, a light position-detecting mechanism 3, and a focusing mechanism 4.

Laser beam-emitting mechanism 1

The laser beam-emitting mechanism 1 comprises laser beam-generating means 6 for generating a semiconductor laser beam in a predetermined wave of pulses, as a measuring beam S, a collimator lens 7 for forming the semiconductor beam emitted as the measuring beam S from the laser beam-generating means 6 into a collimated beam, and a slit means 8 for forming the measuring beam S passed through the collimator lens 7 into a measuring beam $S_1$ having a diameter of several $\mu$m, and a housing 5 in which these component parts are arranged. The laser beam-emitting mechanism 1 is movable in directions indicated by an arrow $e_1$ in the figure whereby the measuring beam $S_1$ can be shifted toward or away from an optical axis $K_1$, referred to hereinafter.

Optical mechanism 2

This mechanism provides a path for guiding the measuring beams $S_1$ et seq., and is comprised of a first dichroic mirror 9 disposed at an angle of 45 deg. with respect to the measuring beam $S_1$ emitted from the laser beam-emitting mechanism 1 for reflecting the measuring beam $S_1$ in a direction perpendicular to the original direction, a half mirror 10 which is disposed at the same angle as the first dichroic mirror 9, a second dichroic mirror 11 disposed at the same angle as the first dichroic mirror 9 with a reflecting surface thereof opposed to that of the first dichroic mirror 9, an objective lens 12, and two focusing lenses, i.e. a first focusing lens 13, which is the larger, and a second focusing lens 14, which is the smaller. As a result, in the optical mechanism 2, there are four optical axes $K_1$, $K_2$, $K_3$, and $K_4$ formed. Further, the first and second dichroic mirrors 9 and 11 have the characteristics that they reflect only the light having a wavelength of the measuring beams $S_1$ et seq. of the present embodiment, and permits other lights having the other wavelengths to be transmitted therethrough.

Light position-detecting mechanism 3

Behind the focusing lenses 13 and 14 aligned on the optical axis $K_4$ of the optical mechanism 2, there are arranged a first light position detector 15 and a second light position detector 16, respectively. The light position detectors 15 and 16 are split-in-two photosensors formed of photosensors '15a and 15b' and '16a and 16b', respectively. The former operates in rough adjustment of focusing, while the latter in fine adjustment of same. Further, a slit 17 is provided between the photosensors 15a and 15b of the first light position detector 15, which has a width of several $\mu$m slightly larger than the diameter of a measuring beam $S_9$ to be described later. The second light position detector 16 receives only a measuring beam $S_{10}$ having passed through the slit 17 and redirected by the second focusing lens 14. When the second light position detector 16 receives the measuring beam $S_{10}$, the first light position detector 15 is switched to an inoperative state in which it does not detect light. The light position detectors 15 and 16 are adapted to detect only the measuring beam $S_{10}$ in the form of a predetermined wave of pulses emitted from the laser beam-emitting mechanism 1, and not to detect other pulsed beams. The photosensors of the light position detectors 15 and 16 of the present embodiment are formed by semiconductor photo-sensitive detector (PSD), and depending on which of the photosensors 15a and 15b receives the measuring beam $S_9$, the light position detector 15 receives a position signal containing positional information of the measuring beam $S_9$, while the second position detector 16 receives a position signal containing positional information of the measuring beam $S_{10}$ depending on which of the photosensors 16a and 16b receives the measuring beam $S_{10}$, without the need for any scanning of an image, but with higher resolution and a higher sampling grade than such solid state imaging elements as CCD and MOS. The light position detectors 15 and 16 only detect central positions of spots of the measuring beams $S_9$ and $S_{10}$ formed thereon, and deliver the aforementioned signals indicative of the central positions, respectively. Therefore, the light position detectors 15 and 16 are not adversely affected even if the luminance distribution is varied, and hence the focusing accuracy is not susceptible to a contrast on a surface of an object T (i.e. they assure high noise-resistance and measurement reliability of the apparatus of the invention).

Focusing mechanism 4

The focusing mechanism 4 employed here is a "servo mechanism" having a very high operating speed for driving a motor by means of a servo circuit. The focusing mechanism 4 supports the objective lens 12 in such a manner that the objective lens 12 can be moved in directions indicated by directions $e_2$ in FIG. 1, whereby the distance f between the object T and the objective lens 12 can be adjusted in response to a position signal from the light position detector 15 or 16 such that the measuring beam $S_{10}$ is received at a balanced position of the photosensors 15a and 15b, or at a balanced position of the photosensors 16a and 16b.

Next, the operation of the two-stage detection non-contact positioning apparatus will be described.

In-Focus State (Refer to FIG. 1)

The semiconductor laser beam emitted from the laser beam-generating means 6 as the measuring beam S is converted by the collimator lens 7 into a collimated beam, which is then emitted out through the slit means 8 as a thin beam having a diameter of several $\mu$m to form the measuring beam $S_1$ parallel to the optical axis $K_1$. The measuring beam $S_1$ is reflected by the first dichroic mirror 9 to be transmitted as a measuring beam $S_2$ which is parallel to the optical axis $K_2$. The measuring beam $S_2$ passes through the half mirror 10 and is reflected by the second dichroic mirror 11 to be transmitted as a measuring beam $S_3$ which is parallel to the optical axis The measuring beam $S_3$ is refracted by the objective lens 12 to be transmitted as a measuring beam $S_4$ directed toward the object T. In the case of an example shown in FIG. 1, the distance between the objective lens 12 and the object T exactly coincides with the focal length f of the objective lens 12, so that the measuring beam $S_4$ refracted by the objective lens 12 impinges on the focal point P aligned on the optical axis $K_3$ at a beam angle $\theta$ formed between the measuring beam $S_4$ and the surface of the object T, and then reflected by the surface of the object T to be transmitted as the measuring beam $S_5$.

The reflected measuring beam $S_5$ is refracted again by the objective lens 12 to form a measuring beam $S_6$ which is parallel to the optical axis $K_3$. The measuring beam $S_6$ is reflected by the second dichroic mirror 11 to be transmitted as a measuring beam $S_7$ which is parallel to the optical axis $K_2$. The measuring beam $S_7$ is reflected by the half mirror 10 to become a measuring beam $S_8$ which is parallel to the optical axis $K_4$, and refracted by the first focusing lens 13 to form a measuring beam $S_9$. The measuring beam $S_9$ passes through the slit 17 of the first light position detector 15 and is then refracted by the second focusing lens 14 to form the measuring beam $S_{10}$, which is received at a central point of the second light position detector 16. Since the measuring beam $S_{10}$ is received at the central point of the second light position detector 16, no position signal is delivered therefrom to the focusing mechanism 4, and hence the objective lens 12 is not shifted for a change of its position.

Figure 2:
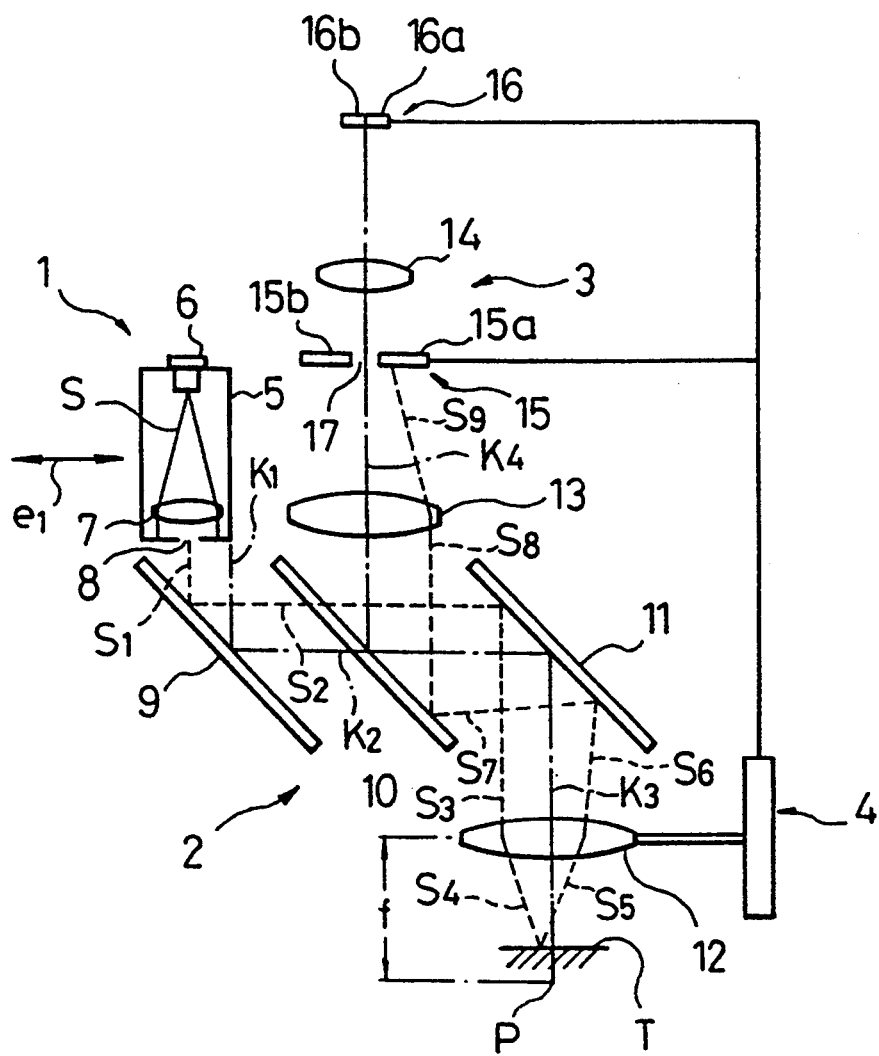
FIG. 2 is a schematic explanatory diagram showing the arrangement of the apparatus of FIG. 1, in the state of an object located closer to an objective lens.

State of Object T Located Closer to Objective Lens 12 (Refer to FIG. 2)

When the object T is positioned closer to the objective lens 12 than the focal point P is, the measuring beam $S_4$ refracted by the objective lens 12 is reflected at a leftward-shifted point on the surface of the object T with respect to the optical axis $K_3$ as viewed from FIG. 2. The reflected measuring beam $S_5$ is refracted by the objective lens 12, but none of the resulting measuring beam $S_6$, and the measuring beams $S_7$ and $S_8$ subsequently formed therefrom are parallel to the optical axes $K_3$, $K_2$, and $K_4$, respectively. Therefore, the measuring beam $S_9$ formed by refraction at the first focusing lens 13 is received by the photosensor 15a of the light position detector 15 located on the right side as viewed from FIG. 2. Receiving the measuring beam $S_9$, the photosensor 15a on the right side delivers a position signal indicative of a received point to the focusing mechanism 4, which, in response to the position signal, moves the objective lens 12 upward as viewed from the figure to cause the measuring beam $S_9$ to be received at a more balanced position of the photosensors 15a and 15b, i.e. at an inner point of the light position detector 15. When the objective lens 12 is thus moved, the point at which the measuring beam $S_9$ is received is shifted toward the slit 17 located in the center of the light position detector 15, and eventually shifted therein so as to permit the measuring beam $S_{10}$ to be received by the second light position detector 16 as shown in FIG. 1. When the second light position detector 16 receives the measuring beam $S_{10}$, the first light position detector 15 is made inoperative, to serve as a mere shield. Therefore, even if the measuring beams $S_1$ to $S_{10}$ utilizing the semiconductor laser beam as monochromatic light are diffracted to produce various scattered lights while they are transmitted through the optical mechanism 2, the scattered lights can be blocked by the first light position detector 15, thereby permitting only a proper beam, i.e. the measuring beam $S_{10}$ to be received by the second light position detector 16. When the second light position detector 16 receives the measuring beam $S_{10}$, the focusing mechanism 4 further moves the objective lens 12 upward or downward such that the left and right photosensors 16a and 16b receive the measuring beam $S_{10}$ at respective areas identical in size to each other, thus enabling the precise adjustment of positioning to be performed without being adversely affected by the scattered lights.

Although in the present embodiment, description is made hereinabove and hereinbelow mainly of examples in which the objective lens 12 is moved for positional adjustment, it goes without saying that the object T may be moved instead of moving the objective lens 12.

Figure 3:
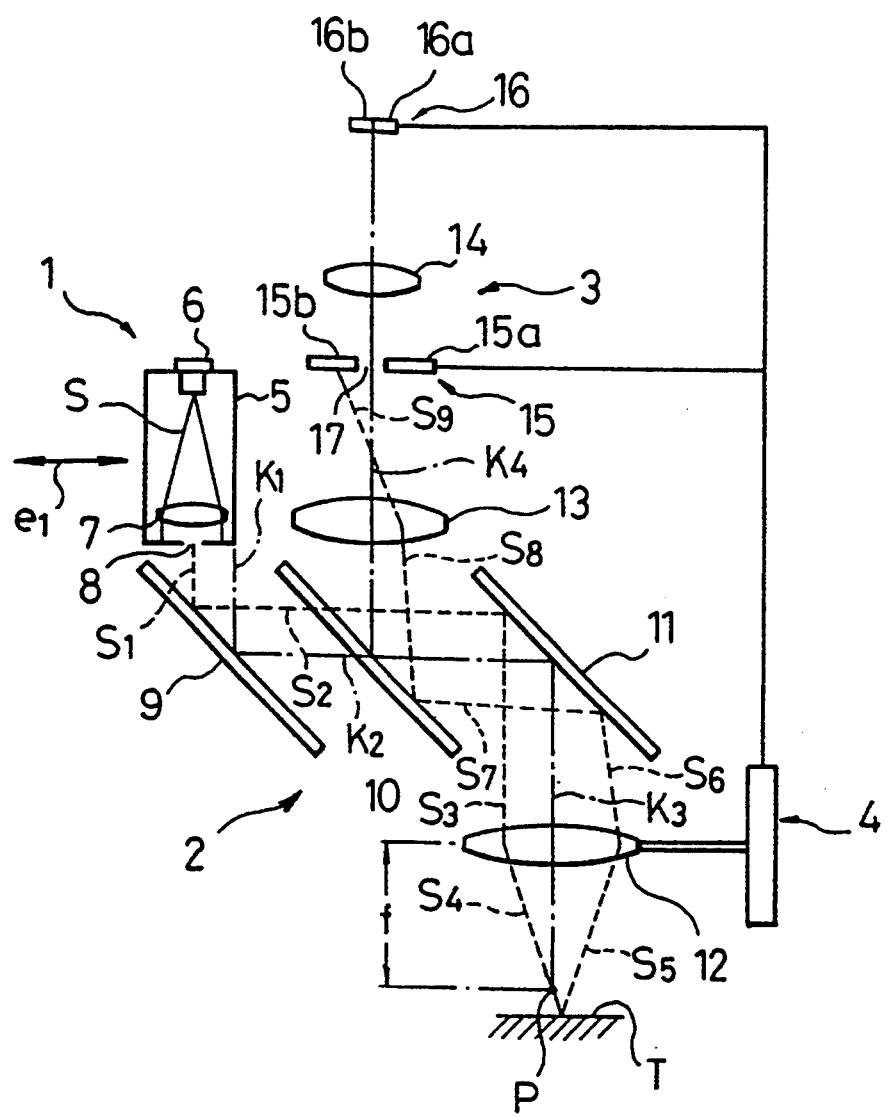
FIG. 3 is a schematic explanatory diagram showing the arrangement of the apparatus of FIG. 1, in the state of the object being located farther from the objective lens.

State of Object T Located Farther from Objective Lens 12 (Refer to FIG. 3)

When the object T is positioned farther from the objective lens 12 than the focal point P, the measuring beam $S_4$ refracted by the objective lens 12 is reflected at a rightward-shifted point on the surface of the object T with respect to the optical axis $K_3$ as viewed from FIG. 3. The reflected measuring beam $S_5$ is refracted by the objective lens 12, but the resulting measuring beam $S_6$, and the measuring beams $S_7$ and $S_8$ subsequently formed therefrom are each inclined in respective manners opposite to the case of FIG. 2, so that none of them are parallel to the optical axes $K_3$, $K_2$, and $K_4$, respectively. Therefore, the measuring beam $S_9$ formed by refraction at the first focusing lens 13 is received by the photosensor 15b of the light position detector 15 located on the left side as viewed from FIG. 3. Accordingly, the focusing mechanism 4 moves the objective lens 12 downward as viewed from the figure such that the measuring beam $S_9$ is received at areas of the photosensors 15a and 15b, which are equal in size to each other. Thus, the measuring beam $S_9$ is directed to the slit 17 of the of the light position detector 15, thereby permitting the measuring beam S to be received by the second light position detector 16. Thereafter, the precise adjustment of focusing is performed in a manner similar to that described hereinabove.

Figure 4:
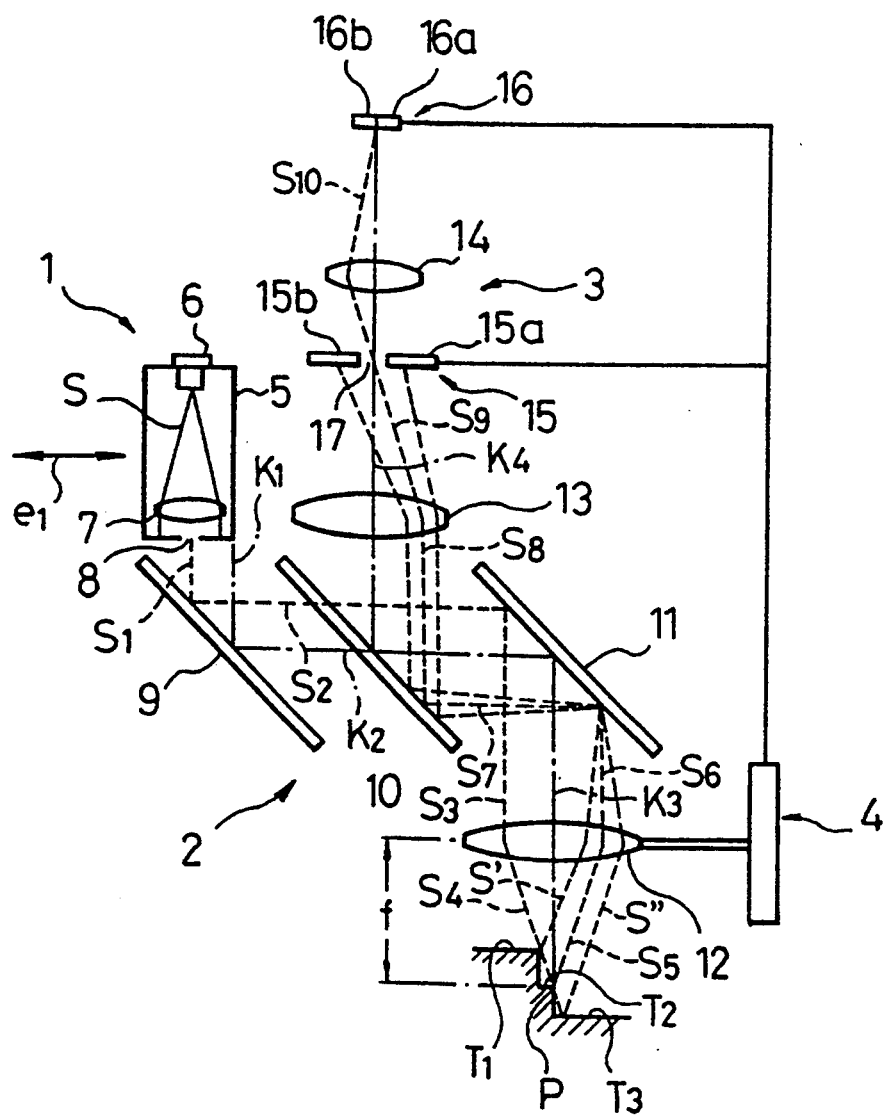
FIG. 4 is a schematic explanatory diagram showing the arrangement of the apparatus of FIG. 1 indicating the case of positioning on an object which is difficult to sense.

Focusing on Object Difficult to Be Sensed (Refer to FIG. 4)

The measuring beams $S_1$ to $S_{10}$ produce scattered lights in various directions while they are transmitted through the optical mechanism 2 as already described hereinabove. If an object T has stepped surface portions $T_1$, $T_3$ which are different in level and located adjacent to a surface portion $T_2$ to be sensed, as shown in FIG. 4, there are a measuring beam (scattered light) S' reflected by the upper surface portion $T_1$, and a measuring beam (scattered light) S" reflected by the lower surface portion $T_3$, in addition to the measuring beam $S_4$ reflected by the surface portion $T_2$ to be detected. These measuring beams (scattered lights) S' and S" having been reflected by the respective surface portions $T_1$ and $T_3$ eventually impinge on the photosensors 15a and 15b of the first light position detector 15. However, when the focusing adjustment has been completed by moving the objective lens 12 in such manners as described hereinabove with reference to FIG. 1 to FIG. 3, the measuring beam $S_9$ from the surface portion $T_2$ passes through the slit 17 to be received by the second light position detector 16. Accordingly, the first light position detector 15 is made inoperative to serve as a mere shield, and hence prevents the second light position detector 16 from being adversely affected in the proper detection of the measuring beam $S_{10}$. If the first light position detector 15 is not provided, the measuring beams (scattered lights) S' and S" are received by the second light position detector 16, which will degrade the accuracy of detection of the measuring beam $S_{10}$ to be detected. Recently, in the semiconductor industry, semiconductor parts has come to be arranged on a substrate in an even higher density. Therefore, if a substrate having semiconductors mounted thereon is selected as the object T, it is often required to focus on a surface portion having adjacent surface portions different in level. Even in such cases, the two-stage detection noncontact positioning apparatus of the present embodiment can focus on a desired surface or perform positioning thereof in an accurate manner.

Next, there will be described the performance of the apparatus of the present embodiment attained by varying the beam angle $\theta$ of the measuring beam $S_4$ relative to the object T.

Detection of Transparent Body T" as Object T (Refer to FIG. 5)

Figures 5A, 5B, 5C:
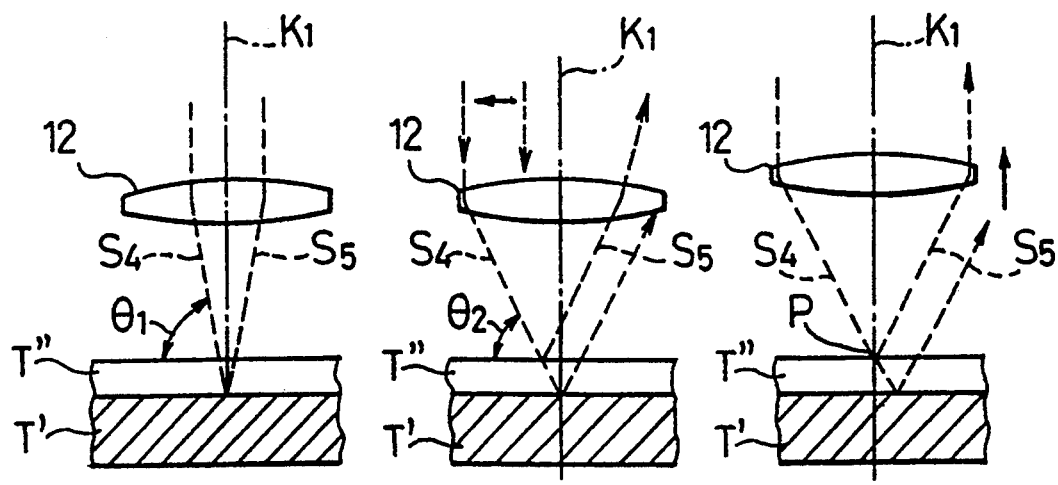
FIGS. 5A–5C are explanatory diagrams, which is useful in explaining the operation of the apparatus in focusing on a transparent body.

In the case where the object T is a transparent body T" to which reverse side an opaque body T' is bonded, if the beam angle $\theta_1$ of the measuring beam $S_4$ refracted by the objective lens 12 is large (i.e. close to an angle perpendicular to the surface of the object), the reflectance on the surface of the transparent body T" is low. Therefore, the measuring beam $S_4$ penetrates into the transparent body T" as shown in FIG. 5(a), and focusing is performed with reference to the surface of the opaque body T' on the reverse side. In such a case, the laser beam-emitting mechanism 1 is shifted in a horizontal direction away from the optical axis $K_1$ (see FIG. 1), whereby the distance between the measuring beam $S_1$ and the optical axis $K_1$ is increased. As a result, the measuring beam $S_4$ is refracted at a portion in the vicinity of periphery of the objective lens 12 to cause the measuring beam $S_4$ to impinge on the object T at a small beam angle $\theta_2$, as shown in FIG. 5b. The smaller the beam angle $\theta_2$ is, the larger is the reflectance on the surface of the transparent body T", and hence the measuring beam $S_5$ reflected on the surface of the transparent body T″ is refracted by the objective lens 12 to pass through the optical mechanism 2 thereafter, and received by the photosensor 15a on the right side of the first light position detector 15 as shown in FIG. 2. Therefore, the first light position detector 15 operates to cause the measuring beam $S_5$ to be eventually directed as the measuring beam $S_9$ to pass through the slit 17 thereof, and then received by the second light position detector 16. Then, the fine adjustment of focusing is performed by moving the objective lens 12 upward to effect precision focusing of the measuring beam on the surface of the transparent body T″, as shown in FIG. 5(c).

Detection of Opaque Body T′ as Object T within Transparent Body T″ (Refer to FIG. 6)

Figures 6A, 6B, 6C:
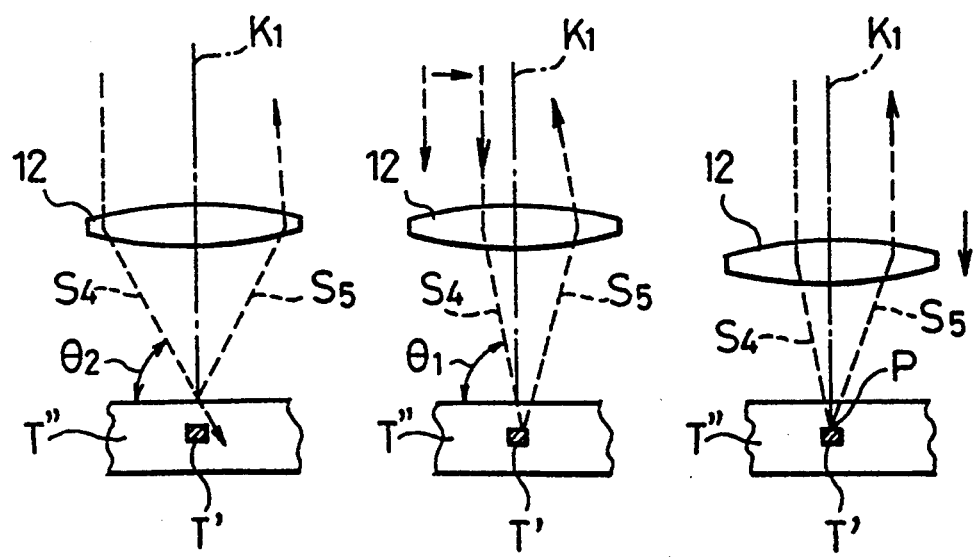
FIGS. 6A–6C are explanatory diagrams, which is useful in explaining the operation of the apparatus in focusing on an opaque body within a transparent body.

In the case where the object T is an opaque body T′ located within a transparent body T″, if the beam angle $\theta_2$ of the measuring beam $S_4$ refracted by the objective lens 12 is small, the measuring beam $S_4$ is reflected by the surface of the transparent body T″ as shown in FIG. 6(a), so that focusing is performed with reference to the surface of the transparent body T″. In such a case, the laser beam-emitting mechanism 1 is shifted in a horizontal direction toward the optical axis $K_1$ (see FIG. 1), whereby the distance between the measuring beam $S_1$ and the optical axis $K_1$ is decreased. As a result, the measuring beam $S_4$ is refracted at a portion in the vicinity of the center of the objective lens 12 to cause the measuring beam $S_4$ to impinge on the object T″ at a larger beam angle $\theta_1$. The larger the beam angle $\theta_1$ is, the smaller is the reflectance on the surface of the transparent body T″, and hence the measuring beam $S_4$ penetrates into the transparent body to impinge on the opaque body T′ within it. The measuring beam $S_5$ reflected from the surface of the opaque body T′ is refracted by the objective lens 12 to pass through the optical mechanism 2 thereafter, and received by the photosensor 15b on the left side of the first light position detector 15 as shown in FIG. 3. Therefore, the first light position detector 15 operates to cause the measuring beam $S_5$ to be eventually introduced as the measuring beam $S_9$ into the slit 17, and then received by the second light position detector 16. Then, the precision adjustment of focusing is performed by moving the objective lens 12 downward to set the focal point P to the surface of the opaque body T′, as shown in FIG. 6(c).

In the semiconductor industry, there are cases where transparent coating is provided on surfaces of component parts e.g. in a step of a manufacturing process of very large scale integrated circuits. Although dependent on the thickness of coating, the two-stage detection noncontact positioning apparatus of the present embodiment is very useful in inspecting an upper or lower surface of coating. Further, the present apparatus is also useful in the process of manufacturing liquid crystal panels, since the construction thereof is suitable for focusing on a transparent glass located on the top, or focusing on a liquid crystal phase located within. Further, the present embodiment is suitable for inspecting such surfaces of magnetic heads each having a transparent body provided on a surface thereof. Further, the present embodiment can be suitably applied to a microscope which requires focusing on a specimen sandwiched between a slide glass and a cover glass as the object to be sensed. In addition, according to the present embodiment, the measuring beam $S_4$ can be made closer to the optical axis $K_3$, by increasing the beam angle $\theta_1$, which makes the present apparatus suitable for focusing on a bottom of a deep and narrow groove formed on an object.

Although, in the above description, the laser beam-emitting mechanism 1 is moved in directions $e_1$ to vary the beam angle $\theta$ of the measuring beam $S_4$, this —s not limitative, but the laser beam-emitting mechanism 1 may be fixed, and instead, the first dichroic mirror 9 for first receiving the measuring beam $S_1$ from the laser beam-emitting mechanism 1 may be shifted in directions indicated by the arrow $e_1$, or shifted toward or away from the laser beam-emitting mechanism 9, to thereby cause the optical axis $K_1$ per se to move toward or away from the measuring beam $S_1$.

Further, although in the above embodiment, the photodiodes (PD's) are used as the first and second light position detectors 15 and 16, this is not limitative, and semiconductor position-sensitive detectors (PSD's) can be used instead, affording similar effects.

By utilization of the above described basic arrangement and its functioning, the following benefits can be obtained:

(1) Because of the capability of positioning (distance setting) of an object T, positioning and setting for various parts (objects) in a specific location can be performed correctly and quickly.

(2) By executing such positioning (distance setting) as aforesaid for a plurality of points on one part (object) at the same time, inclination (perpendicularity) of the part can be measured or set accurately.

(3) By arranging for focusing to be performed by moving the objective lens 12 by means of the focusing mechanism 4 and if the objective lens 12 serves as the objective lens of an optical system such as a microscope or a telescope, positioning can be achieved.

(4) By arranging for focusing to be performed by moving the objective lens 12 and by numerically coding the amount of movement of the objective lens 12 by means of an encoder or the like, it becomes possible to measure the distance between the object T and the objective lens 12 from the numerical value in a noncontacting manner. Such an arrangement can also be applied to noncontact sensors (probes) in a three-dimensional measuring instrument, or to automatic measurement of a liquid surface level.

(5) When a transparent substance is interposed between a reflective object (i.e. a mirror) and the objective lens 12, the thickness of the transparent substance can be measured in a noncontacting manner from the amount of movement measured of the objective lens 12 and refractive index of the transparent substance.

Although in the above embodiment, description is made of examples in which the first and second dichroic mirrors 9 and 11 are arranged within the optical mechanism 2, this is not limitative. If the present apparatus is not applied to a mechanism which should introduce lighting into the optical mechanism 2, however, simple mirrors may be used instead. Further, although in the above examples, the semiconductor laser beam in the form of a predetermined wave of pulses is used as the measuring beam S, this is not limitative either, but the use of a He-Ne laser beam will attain an even higher detecting accuracy. In addition, if the object T has a smooth surface and generates substantially no scattered lights, an ordinary CW (continuous wave) laser other than the pulsed laser is sufficient for use.

As described heretofore, the two-stage detection noncontact positioning apparatus according to the first embodiment is characterized in that the light position-detecting mechanism 3 detects a light position by a two-stage detecting method by the use of the first light position detector 15 and the second light position detector 16 thereof. The first light position detector 15 is used in rough adjustment of focusing, while the second light position detector 16 in fine adjustment of same. More specifically, the measuring beam $S_9$ reflected from the object T and passed through the optical mechanism 2 can be adversely affected by scattered lights dependent on the configuration, surface roughness, etc. of an object T to be sensed, and scattered lights generated within the optical mechanism 2, and therefore, it is impossible to perform accurate sensing of the object T if the measuring beam $S_9$ mixed with such scattered lights is directly used for detection. To eliminate this inconvenience, the measuring beam $S_9$ mixed with the scattered lights is first detected by the first light position detector 15 whereby either the objective lens 12 or the object T is moved to perform rough adjustment of focusing. The measuring beam $S_8$ thus roughly adjusted is refracted by a focusing lens 13 toward an area of the first light position detector 15, through which the optical axis extends, to eventually pass through the slit of the first light position detector 15 and impinge on the second light position detector 16. When the second light position detector 16 receives the measuring beam $S_{10}$, the first light position detector 15 is made inoperative, and thereafter, the second light position detector 16 performs the precise adjustment of focusing. That is, the first light position detector 15 is thus made inoperative to serve as a mere shield, so that scattered lights which would otherwise adversely affect on the detecting accuracy are blocked by the first light position detector 15, which enables the apparatus of the present embodiment to perform accurate focusing based on a proper measuring beam $S_{10}$ alone.

Figure 7:
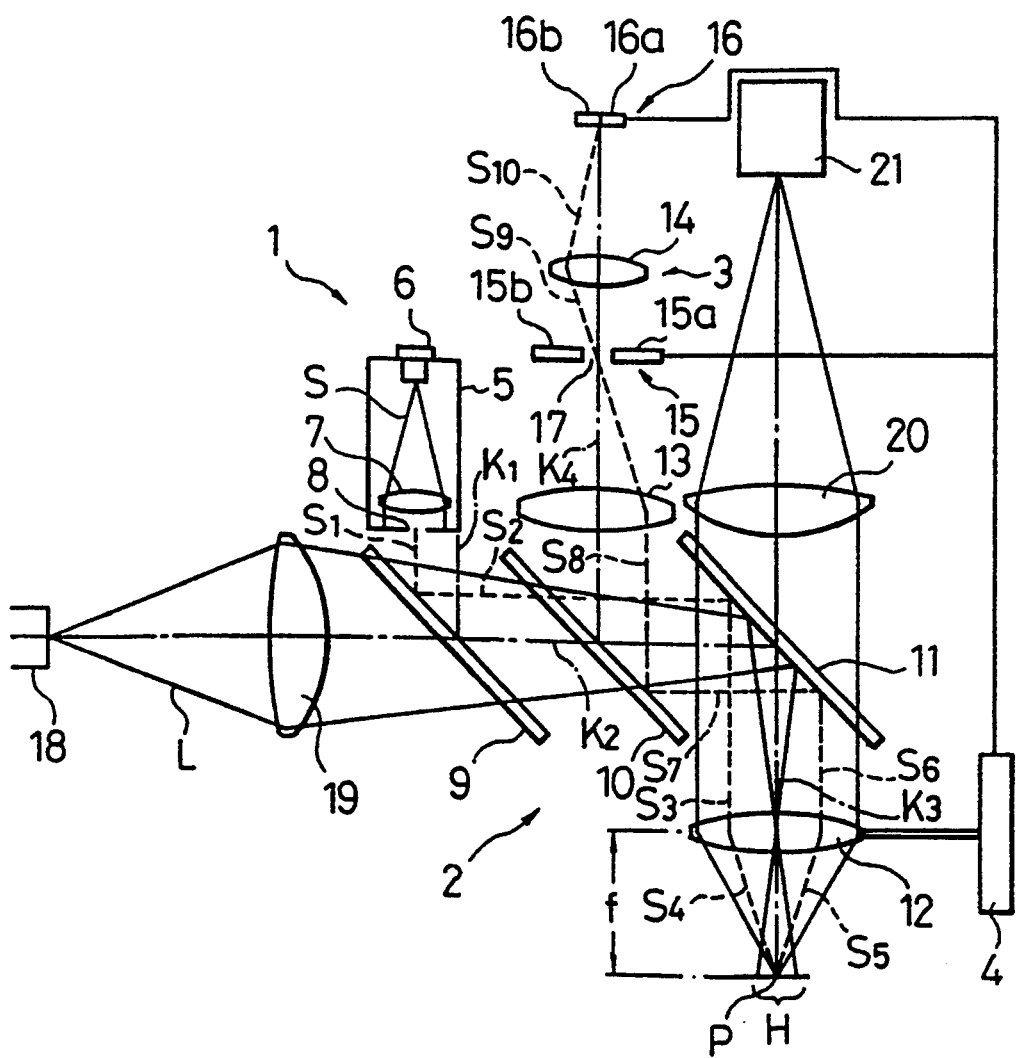
FIG. 7 is a schematic explanatory diagram showing a second embodiment of the invention.

FIG. 7 shows a second embodiment of the present invention. This embodiment is an example of the application (3) described above, in which the two-stage noncontact positioning apparatus is associated with an image-processing mechanism. Reference numeral 18 designates a light source which emits a light L. The light L is focused by a condensing lens 19, and transmitted through the first dichroic mirror 9 and the half mirror 10. Then, the light L is reflected by the second dichroic mirror 11, and transmitted through the objective lens 12 to be cast on a region H of a focal point P and its vicinity. The light L reflected by the region H is refracted by the objective lens 12, and transmitted through the second dichroic mirror 11, followed by being focused by a focusing lens 20 to form an image on an image sensor (CCD camera/camera tube) 21. The objective lens 12 is automatically focused by the light position-detecting mechanism 3 of the two-stage noncontact positioning apparatus, and hence the image sensor 21 can generate an accurate image signal. The image signal is converted into digital data which is subjected to processing by the use of a computer, whereby it is made possible to perform, for instance, area calculation, pattern processing, gray level processing, etc. Further, if the image sensor 21 is replaced by an eyepiece device, a microscope can be obtained.

Figure 8:
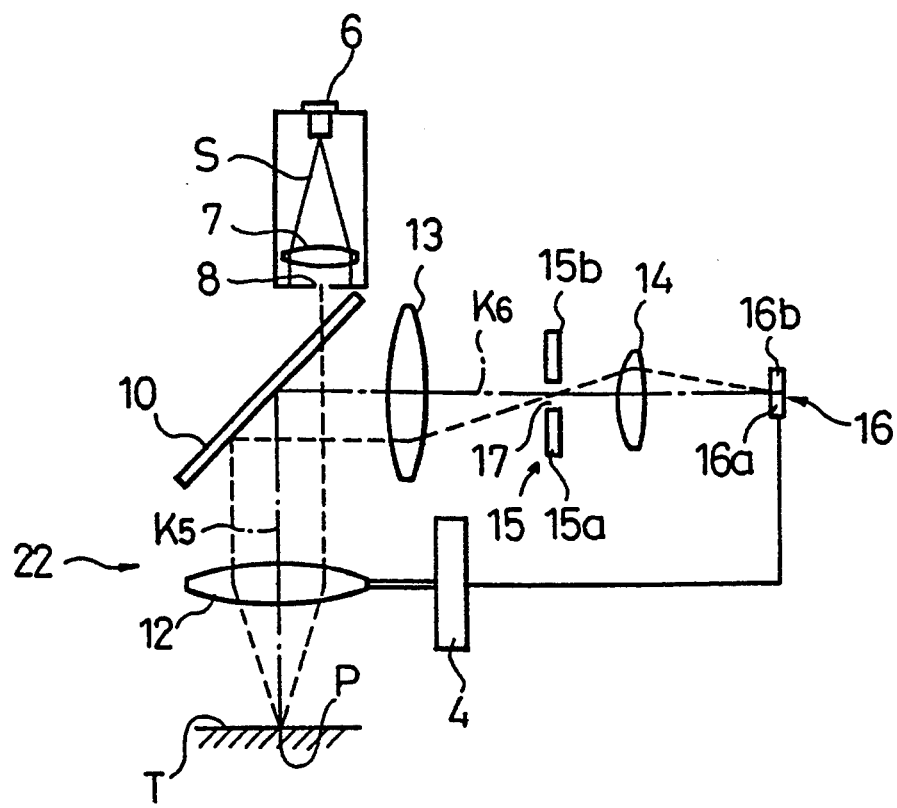
FIG. 8 is a schematic explanatory diagram showing a third embodiment of the invention.

FIG. 8 shows a third embodiment of the invention. This embodiment is distinguished from the first embodiment in that it has a simplified constitution of the optical mechanism. More specifically, the first and second dichroic mirrors 9 and 11 are omitted, and an optical mechanism 22 is provided with one half mirror 10, with two optical axes of $K_5$ and $K_6$. Although simplified in construction, the apparatus of this embodiment can attain performance equivalent to that achieved by the apparatus according to the first embodiment. The simplified construction facilitates incorporation of the apparatus as a unit into other machines.

The two-stage detection noncontact positioning apparatus of the invention is constructed as described heretofore, and when the measuring beam transmitted through the slit of the first light position detector is detected by the second light position detector, the former detector is made inoperative to server as a mere shield which blocks off all scattered lights which would otherwise adversely affect the accuracy of detection by the apparatus, thereby enabling the second light position detector to perform accurate precise adjustment of focusing based on a proper measuring beam alone.

Further, as the measuring beam, a pulsed semiconductor laser beam in the form of a predetermined wave of pulses is used, and at the same time the light position-detecting mechanism is adapted to detect only the pulsed laser beam, which enables the two-stage detection noncontact positioning apparatus of the invention to attain an even higher detecting accuracy.

If a He-Ne laser beam is used as the measuring beam, a very thin laser beam can be obtained, which will further enhance the detecting accuracy.

Further, if the laser beam-emitting mechanism is made movable toward or away from the optical axis, or alternatively, if the mirror means which is to first receive the measuring beam from the laser beam-emitting mechanism is made movable toward or away from the optical axis $K_1$ or laser beam-emitting mechanism, it is possible to adjust the distance between the measuring beam and the optical axis, which in turn makes it possible to change the beam angle formed between the measuring beam and the surface of the object. Therefore, it is possible to perform focusing on a surface of a transparent body, and also to perform focusing on an opaque body within or on a reverse side of a transparent body.

What is claimed is:

1. A two-stage detection noncontact positioning apparatus including:

a laser beam-emitting mechanism for emitting a laser beam as a measuring beam;

an optical mechanism having mirror means for redirecting said measuring beam in a direction parallel to an optical axis, an objective lens for refracting said measuring beam to re-direct said measuring beam toward an object and for refracting again said measuring beam having been reflected from said object, and a focusing lens for causing said measuring beam reflected from said object and refracted by said objective lens to focus on an optical axis;

a light position-detecting mechanism of a split-in-two type for receiving said measuring beam transmitted via said focusing lens and delivering a position signal; and a focusing mechanism responsive to said position signal delivered from said light position-detecting mechanism for moving at least one of said object and said objective lens to thereby automatically focus said measuring beam on a surface of said object, characterized in that:

said light position-detecting mechanism comprises a first light position detector having a slit formed at a central location corresponding to an optical axis, and a second light position detector for receiving said measuring beam passed through said slit of said first light position detector, and is at the same time adapted to operate in a switchable manner such that when said second light position detector receives said measuring beam, said first light position detector is made inoperative to serve as a shield against scattered lights which are not directed to said slit; and said focusing lens comprises a lens provided in a manner corresponding to said first light position detector and a lens provided in a manner corresponding to said second light position detector.

2. The two-stage detection noncontact positioning apparatus according to claim 1, wherein said laser beam-emitting mechanism includes laser beam-generating means for generating a semiconductor laser beam in the form of a predetermined wave of pulses, lens means for forming said semiconductor laser beam into a collimated beam, and slit means for forming said collimated beam into said measuring beam, and wherein said light position-detecting mechanism is adapted to detect only said semiconductor laser beam in the form of said predetermined wave or pulses.

3. The two-stage detection noncontact positioning apparatus according to claim 1, wherein said laser beam-emitting mechanism includes laser beam-generating means for emitting a He-Ne laser beam.

4. The two-stage detection noncontact positioning apparatus according to claim 1, wherein said laser beam-emitting mechanism is movable in directions toward or away from an optical axis to adjust a distance between said measuring beam and said optical axis.

5. The two-stage detection noncontact positioning apparatus according to claim 2, wherein said laser beam-emitting mechanism is movable in directions toward or away from an optical axis to adjust a distance between said measuring beam and said optical axis.

6. The two-stage detection noncontact positioning apparatus according to claim 3, wherein said laser beam-emitting mechanism is movable in directions toward or away from an optical axis to adjust a distance between said measuring beam and said optical axis.

7. The two-stage detection noncontact positioning apparatus according to claim 1, wherein said mirror means has first mirror means to first receive said laser beam from said laser beam-emitting mechanism, said first mirror means being movable in a direction toward or away from an optical axis, or in a direction toward or away from said laser beam-emitting mechanism to adjust a distance between said measuring beam and said optical axis.

8. The two-stage detection noncontact positioning apparatus according to claim 2, wherein said mirror means has first mirror means to first receive said laser beam from said laser beam-emitting mechanism, said first mirror means being movable in a direction toward or away from an optical axis, or in a direction toward or away from said laser beam-emitting mechanism to adjust a distance between said measuring beam and said optical axis.

9. The two-stage detection noncontact positioning apparatus according to claim 3, wherein said mirror means has first mirror means to first receive said laser beam from said laser beam-emitting mechanism, said first mirror means being movable in a direction toward or away from an optical axis, or in a direction toward or away from said laser beam-emitting mechanism to adjust a distance between said measuring beam and said optical axis.

10. The two-stage detection noncontact positioning apparatus according to claim 1 wherein said mirror means of said optical mechanism comprises a first dichroic mirror, a second dichroic, and a half mirror.

11. The two-stage detection noncontact positioning apparatus according to claim 2 wherein said mirror means of said optical mechanism comprises a first dichroic mirror, a second dichroic mirror, and a half mirror.

12. The two-stage detection noncontact positioning apparatus according to claim 3 wherein said mirror means of said optical mechanism comprises a first dichroic mirror, a second dichroic mirror, and a half mirror.

13. The two-stage detection noncontact positioning apparatus according to claim 4 wherein said mirror means of said optical mechanism comprises a first dichroic mirror, a second dichroic mirror, and a half mirror.

14. The two-stage detection noncontact positioning apparatus according to claim 5 wherein said mirror means of said optical mechanism comprises a first dichroic mirror, a second dichroic mirror, and a half mirror.

15. The two-stage detection noncontact positioning apparatus according to claim 6 wherein said mirror means of said optical mechanism comprises a first dichroic mirror, a second dichroic mirror, and a half mirror.

16. The two-stage detection noncontact positioning apparatus according to claim 7 where n said mirror means of said optical mechanism comprises a first dichroic mirror, a second dichroic mirror, and a half mirror.

17. The two-stage detection noncontact positioning apparatus according to claim 8 wherein said mirror means of said optical mechanism comprises a first dichroic mirror, a second dichroic mirror, and a half mirror.

18. The two-stage detection noncontact positioning apparatus according to claim 9 wherein said mirror means of said optical mechanism comprises a first dichroic mirror, a second dichroic mirror, and a half mirror.

19. The two-stage detection noncontact positioning apparatus according to claim 1, wherein said mirror means of said optical system comprises one half mirror, without using first and second dichroic mirrors.

20. The two-stage detection noncontact positioning apparatus according to claim 2, wherein said mirror means of said optical system comprises one half mirror, without using first and second dichroic mirrors.

21. The two-stage detection noncontact positioning apparatus according to claim 3, wherein said mirror means of said optical system comprises one half mirror, without using first and second dichroic mirrors.

22. The two-stage detection noncontact positioning apparatus according to claim 4, wherein said mirror means of said optical system comprises one half mirror, without using first and second dichroic mirrors.

23. The two-stage detection noncontact positioning apparatus according to claim 5, wherein said mirror means of said optical system comprises one half mirror, without using first and second dichroic mirrors.

24. The two-stage detection noncontact positioning apparatus according to claim 6, wherein said mirror means of said optical system comprises one half mirror, without using first and second dichroic mirrors.

25. The two-stage detection noncontact positioning apparatus according to claim 7, wherein said mirror means of said optical system comprises one half mirror, without using first and second dichroic mirrors.

26. The two-stage detection noncontact positioning apparatus according to claim 8, wherein said mirror means of said optical system comprises one half mirror, without using first and second dichroic mirrors.

27. The two-stage detection noncontact positioning apparatus according to claim 9, wherein said mirror means of said optical system comprises one half mirror, without using first and second dichroic mirrors.

28. The two-stage detection noncontact positioning apparatus according to claim 1, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

29. The two-stage detection noncontact positioning apparatus according to claim 2, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

30. The two-stage detection noncontact positioning apparatus according to claim 3, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

31. The two-stage detection noncontact positioning apparatus according to claim 4, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

32. The two-stage detection noncontact positioning apparatus according to claim 5, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

33. The two-stage detection noncontact positioning apparatus according to claim 6, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

34. The two-stage detection noncontact positioning apparatus according to claim 7, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

35. The two-stage detection noncontact positioning apparatus according to claim 8, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

36. The two-stage detection noncontact positioning apparatus according to claim 9, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

37. The two-stage detection noncontact positioning apparatus according to claim 10, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

38. The two-stage detection noncontact positioning apparatus according to claim 11, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

39. The two-stage detection noncontact positioning apparatus according to claim 12, including an image-processing mechanism associated therewith, said image-processing mechanism having a light source for emitting a light, a condensing lens for focusing said light toward said mirror means of said optical mechanism, and an image sensor for receiving, via a focusing lens, said light saving been cast on a region of a focal point and its vicinity and reflected therefrom, to form an image.

40. The two-stage detection noncontact positioning apparatus according to claim 13, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

41. The two-stage detection noncontact positioning apparatus according to claim 14, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

42. The two-stage detection noncontact positioning apparatus according to claim 15, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

43. The two-stage detection noncontact positioning apparatus according to claim 16, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

44. The two-stage detection noncontact positioning apparatus according to claim 17, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

45. The two-stage detection noncontact positioning apparatus according to claim 18, including an image-processing mechanism associated therewith, said image-processing mechanism having a light source for emitting a light, a condensing lens for focusing said light toward said mirror means of said optical mechanism, and an image sensor for receiving, via a focusing lens, said light having been cast on a region of a focal point and its vicinity and reflected therefrom, to form an image.

* * * * *